United States Patent [19]

Creek et al.

[11] 4,190,857
[45] Feb. 26, 1980

[54] PERISCOPE ASSEMBLY

[75] Inventors: Ronald B. Creek; John P. Cook, both of Chattanooga, Tenn.

[73] Assignee: Combustion Engineering, Inc., Windsor, Conn.

[21] Appl. No.: 913,930

[22] Filed: Jun. 8, 1978

[51] Int. Cl.² ............................................. H04N 7/18
[52] U.S. Cl. ................................ 358/100; 358/2.25; 358/229
[58] Field of Search ............... 358/100, 210, 217, 225, 358/229; 356/241

[56] References Cited

U.S. PATENT DOCUMENTS 3,229,577  1/1966  Ellinger ................................ 358/100
4,131,914  12/1978  Bricmont ............................ 358/100

Primary Examiner—Howard W. Britton
Attorney, Agent, or Firm—Wayne H. Lang

[57] ABSTRACT

A remotely controlled periscope assembly that is used in conjunction with closed circuit television apparatus to view the inside of tubes in a nuclear steam generator or other apparatus. The periscope assembly is moved universally to any given location and then it is readily collapsed after visual identity has been accomplished to permit the insertion of an aligned tool deemed necessary for maintenance or repair.

10 Claims, 4 Drawing Figures

PERISCOPE ASSEMBLY

BACKGROUND OF THE INVENTION

The present invention relates to remotely controlled apparatus that may be moved horizontally to any predetermined location with respect to a tube sheet of a nuclear steam generator to view the inside of a particular tube connected thereto and to actuate equipment necessary for the maintenance of the tubes. Since a nuclear steam generator is usually highly radioactive and thus generally unavailable for close observation or repair, this apparatus is provided to permit an operator to make remote observation and repair of such a steam generator as viewed by a periscopic device through a standard television monitor.

SUMMARY OF THE INVENTION

This invention therefore is directed to a viewing mechanism and repair tool including a collapsible periscope which is positioned between a predetermined tube of a nuclear steam generator and a television camera to which a conventional television monitor is connected. The tool holder, tool, periscopic viewing device and the television camera are all combined in a single assembly and adapted to be moved laterally over a track which is itself arcuately movable about the end of the steam generator. The television camera is connected to a standard television monitor whereby a predetermined "sight" as viewed by the camera may be transmitted to a remote location for observation by an operator. After accurate visual observation has been attained between a certain tube and a holder for a tool such as a drill means, the objective mirror of the periscopic viewing system is collapsed and moved out of alignment with the tube so that a suitable tool may be moved into an appropriate location without interference from the periscope. The viewing mirror of the periscopic viewing mechanism is then moved to a proper angle to permit the continuation of visual monitoring through the television camera.

BRIEF DESCRIPTION OF THE DRAWING

A better understanding of the invention may be had by referring to the drawing in which.

DESCRIPTION OF THE PREFERRED EMBODIMENT

Figure 1:
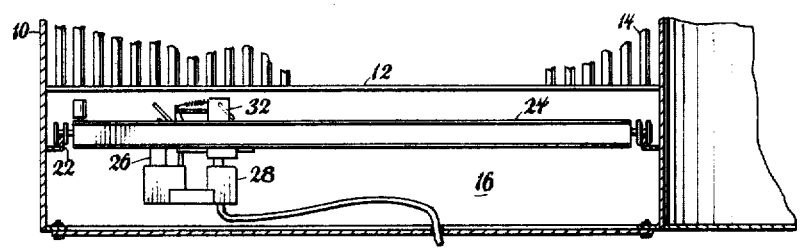
FIG. 1 is a partial cross-section showing the end portion of a steam generator having a remote controlled apparatus according to this invention.
Figure 2:
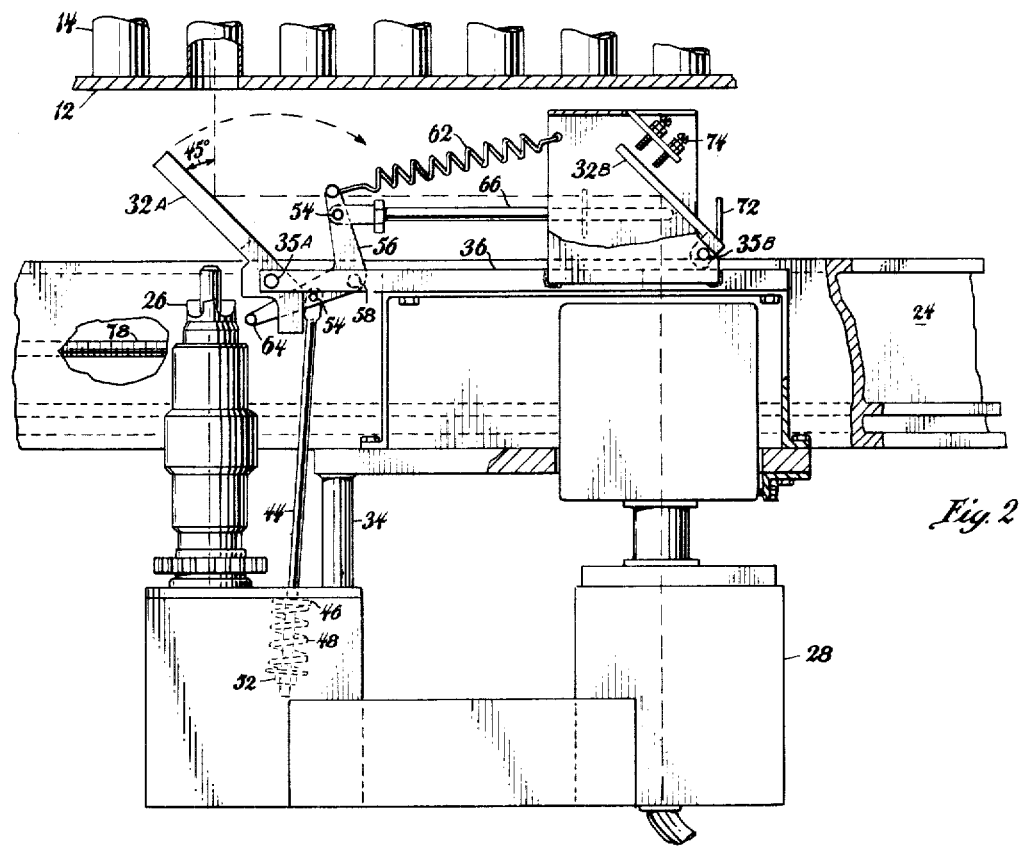
FIG. 2 is an enlarged cross-section showing the details of the viewing device as related to a withdrawn tool.
Figure 3:
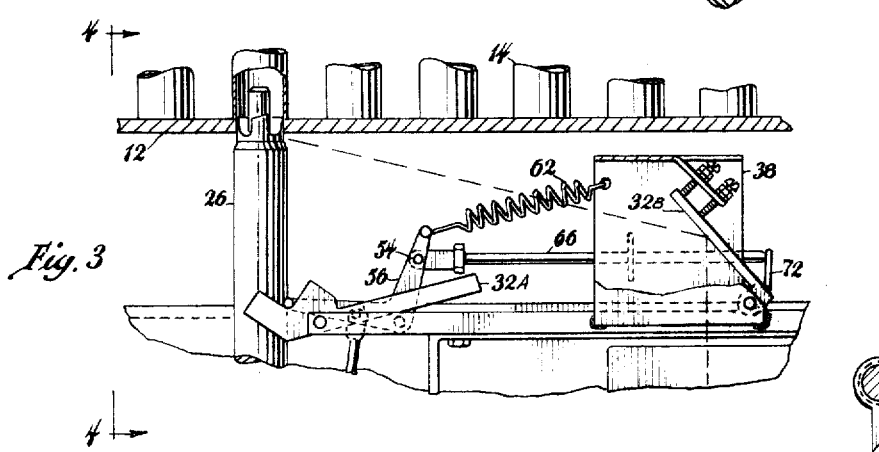
FIG. 3 is an enlarged cross-section showing the details of the device as related to an advanced tool.
Figure 4:
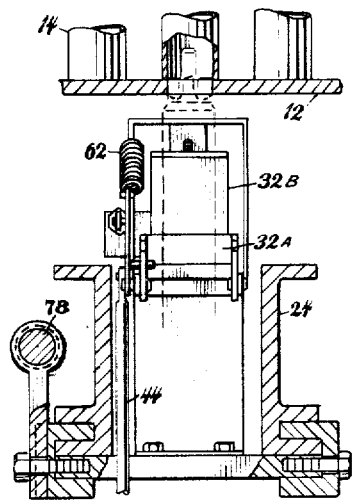
FIG. 4 is an enlarged view of the device as seen from line 4—4 of FIG. 3.

Referring now to FIG. 1, the drawing shows a standard nuclear steam generator having a cylindrical housing 10 with apertured tube sheets 12 at opposite ends thereof spaced to receive elongate tubes 14 therebetween in axially aligned apertures of the tube sheet.

Situated at one end of the generator is a plenum chamber 16 that lies intermediate the tube sheet 12 and an access plate. An annular track 22 extends around the inner wall of the housing 10 to provide a base for a wheeled beam 24 that extends diametrically across the housing. A tool 26 and television camera 28 assembly with a periscopic viewer 32 therebetween is movably mounted on the beam 24, while the assembly includes means (not shown) for moving it radially along said beam. Suitable controls are also provided whereby the entire beam 24 may be rotated about the track 22, while the assembly 26-28-32 may be moved radially over beam 24 to any predetermined location on the face of the tube sheet so that alignment between any selected tube and the working tool may be readily effected. Inasmuch as the controls are all conventional and comprise no basis for the invention, no further mention of them is deemed necessary.

The tool assembly 26 is mounted for vertical movement on a track 34 that extends normal to the beam 24. At the same time the track 34 as well as the periscope 32 and the television camera 28 are radially movable as a unit along the beam 24 whereby the tool assembly 26 may be aligned with any tube of the steam generator by proper sighting through the periscope assembly 32 as seen by the television camera 28.

The tool 26 is first aligned with the tube 14 of the nuclear reactor on which a predetermined function, such as drilling, is to be performed. Alignment is made by visually aligning the objective mirror 32A of the periscope with a tube 14 as viewed through the viewing lens 32B of the periscope and the television camera 28. Inasmuch as the objective mirror 32A of the periscope is axially aligned with the tool 26, visual alignment of the objective mirror 32A with a tube 14 of the steam generator will automatically dictate that the same tube of the steam generator will be simultaneously aligned with the tool assembly 26.

The entire periscope assembly includes the objective mirror 32A along with a viewing mirror 32B pivotally mounted at 35A and 35B respectively on a base plate 36. The objective mirror 32A is adapted to lie normally at 45° from the vertical whereby the line of sight will be vertically down from a given tube to the mirror 32A, then reflected horizontally to mirror 32B, and then vertically again to the objective lens of the television viewing camera.

While the mirror 32A is precluded from moving on pivot 35A to more than 45° from the vertical, it is not precluded from pivoting oppositely until it lies horizontally adjacent frame 36 so that it may be entirely removed from the horizontal line of sight as seen by mirror 32B.

The mirror 32B is pivoted to side frame 38 and is adapted to lie normally at exactly 45° from the vertical to thus transmit a horizontal line of sight through the periscope to a vertically disposed camera 28. If the mirror 32B is to a position slightly less than 45° from the vertical, the line of sight will be deflected upward to the tube sheet of the steam generator as seen by the camera 28.

Thus, the mirror 32B is mounted on a pivot 35B that permits it to be rotated back slightly to less than 45° from the vertical whereby the line of sight will be directed upward to the tube sheet. However, inasmuch as both the angle of incidence and the angle of reflection are less than 45°, the viewed image will still be transmitted from the tube sheet to the vertically displaced camera 28.

The tool holder 26 is first aligned with a predetermined tube 14 on which a selected operation is to be performed by moving the entire assembly 26-28-32 along the beam 24 by means 78 such as a longitudinal drive screw and actuating controls (not shown). When the tool assembly is moved vertically on track 34 toward the tube 14, a push rod 44 is supported by bracket 46 carried by a holder for the tool 26. The rod carries a compression spring 48 between an adjusting nut 52 on the threaded end of rod 44, whereby the compression on the spring may be varied by turning the nut on the rod 44. Similarly, upward movement of rod 44 will move the bracket 46 upward thereby releasing compression upon the spring. As the compression on spring 48 is relieved, the tension spring 62 is permitted to activate the lens linkage as will be defined later.

The rod 44 is pivotally connected at 54 to an arm of bell-crank 56 which is itself pivoted at 58 to base plate 36. An end of bell-crank 56 carries a lateral sleeve 64 that is arcuately aligned with a side of mirror 32A whereby relieving the compression on spring 48 will allow tension spring 62 to predominate and rotate bell-crank 56 about pivot 58, thus causing sleeve 64 to contact the side of mirror 32A and rotate mirror 32A about its pivot 35A. Continued upward movement of the tool assembly and push rod 44 will permit spring 62 to continue moving sleeve 64 against the mirror 32A until it drops down on base plate 36 out of the line of sight from mirror 32B. Thus the line of sight as viewed by mirror 32B is now aimed at the advancing tool 26, and the tool may be watched by camera 28 as it approaches the tube sheet 12 so that an operator will have an unobstructed view of the operation being performed.

As the tool 26 advances toward the tube sheet 12, the spring 62 continues to move the arm of bell-crank 56 because of the decreased compressive force on spring 48. The pivotal movement of bell-crank 56 causes the push rod 66 to move horizontally because of the pivotal connection 54. As the push rod is drawn back horizontally it contacts plate 72 at the rear of mirror 32B, thus causing the plate 72 to rotate about pivot 35B so that mirror 32B is angled upward to direct the reflected line of sight to the tube sheet and the particular tube being worked on. Thus the operation being performed on the tube may be watched through the periscopic viewer and the television camera.

The reverse rotation of mirror 32B is limited by set screws 74 on bracket 76 whereby the upward tilt of the mirror may be regulated to provide the view required.

Downward movement of the tool 26 away from the ends of tubes 12 of the steam generator will cause a downward movement of bracket 46 and the compression of spring 48 against adjusting nut 52. Compression of spring 48 will stretch spring 62 thereby moving the push rod 44 away from plate 12 to permit the mirror 32B to assume its normal position at 45° from the vertical line of sight from television camera 28. Further downward movement of the tool 26 will cause the sleeve 64 on bell-crank 56 to flip mirror 32A back up to a normal 45° position whereby periscopic vision to the end of the tube sheet may be resumed by means of television camera 28.

I claim:

1. Apparatus for viewing the inside of tubes connected to an apertured tube sheet of a steam generator comprising track means adjacent the surface of the tube sheet, a viewing assembly including a television camera axially aligned with said tubes and mounted on said track for lateral movement relative to the surface of the tube sheet, a periscopic viewing device for said camera having a viewing mirror and an objective mirror mounted on said track to provide a line of sight between the viewing mirror and the objective mirror that is substantially parallel to said track, a tool holder mounted on said track in alignment with the objective mirror and adapted to be moved in a path normal to the line of sight between the objective and viewing mirrors, and means for moving the objective lens of the periscopic viewing device from the path of movement of the vertical tool holder thereby permitting unrestricted movement of the tool holder.

2. Apparatus as defined in claim 1 wherein said track means extends horizontally across the surface of the tube sheet and around the periphery of the steam generator to provide access to each tube.

3. Apparatus as defined in claim 2 including a vertical track means that is carried by the horizontal track arranged to permit moving the tool holder vertically thereon normal to the line of sight between the objective and viewing mirrors of the periscope.

4. Apparatus for remotely viewing the inside of tubes in a steam generator as defined in claim 3 including a base plate, said base plate adapted to provide a platform for the viewing assembly as it is moved laterally over said horizontal track.

5. Apparatus as defined in claim 4 wherein the objective mirror and the viewing mirror of the periscope are adapted to rest normally at 45° from the vertical whereby a line of sight is transmitted horizontally therebetween.

6. A viewing assembly as defined in claim 5 including pivot means for attaching the viewing mirror and the objective mirror to the base plate, and an upright push rod carried by said tool holder adapted to arcuately move the objective mirror of the periscope about its pivot means when the tool holder is moved vertically toward the tube sheet.

7. A viewing assembly as defined in claim 6 including a bell-crank that has first and second arms that extend angularly outward from a fulcrum, means pivotally attaching the fulcrum to the base plate, means pivotally attaching the push rod to the first arm of the bell-crank, and a lateral sleeve on the bell-crank adapted to contact the objective mirror of the periscope to move it arcuately about its pivot when the tool holder is advanced toward the tube sheet.

8. A viewing assembly as defined in claim 7 including a horizontal push rod, means pivotally connecting the horizontal push rod to the second arm of the bell-crank, said push rod being adapted to contact the viewing mirror and rotate it about its pivot when the objective mirror has been removed from the vertical axis between the tool holder and a predetermined tube of the steam generator.

9. A viewing assembly as defined in claim 8 including means that limit the rotation of the viewing mirror about its pivot means.

10. A viewing assembly as defined in claim 9 including a tension spring attached to the second arm of the bell-crank, said tension spring adapted to hold the horizontal push rod against the viewing mirror of the periscope after the upright push rod has been raised.

* * * * *